United States Patent
Woo et al.

(10) Patent No.: US 10,263,544 B2
(45) Date of Patent: Apr. 16, 2019

(54) SYSTEM AND METHOD FOR USING AND CONTROLLING PERMANENT MAGNET AC MOTOR IN PLACE OF TRIAC-CONTROLLED PSC MOTOR

(71) Applicant: Nidec Motor Corporation, St. Louis, MO (US)

(72) Inventors: Chee Ngai Woo, Singapore (SG); Peng Fei Sun, Qingdao (CN); Hui Zheng, Qingdao (CN)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/987,708

(22) Filed: May 23, 2018

(65) Prior Publication Data

US 2018/0269812 A1     Sep. 20, 2018

Related U.S. Application Data

(63) Continuation of application No. 15/435,050, filed on Feb. 16, 2017, now Pat. No. 9,998,041.

(30) Foreign Application Priority Data

Jan. 19, 2017   (CN) .......................... 2017 1 0043230

(51) Int. Cl.
  *H02P 1/42*    (2006.01)
  *H02P 7/295*   (2016.01)
  *H02P 6/08*    (2016.01)
  *H02P 27/08*   (2006.01)

(52) U.S. Cl.
  CPC ..................................... *H02P 6/08* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,348,625 A | * | 9/1982 | Sharp ..................... | H02P 23/186 318/715 |
| 4,481,448 A | * | 11/1984 | Bishop .................. | H02P 25/145 318/245 |
| 4,568,193 A | * | 2/1986 | Contri ................... | A47J 43/082 366/197 |
| 4,584,507 A | * | 4/1986 | Taylor ................. | H02P 23/0077 388/813 |
| 5,495,161 A | * | 2/1996 | Hunter .................. | H02P 25/145 318/245 |
| 2016/0268933 A1 | * | 9/2016 | Kim ........................ | H02P 27/02 |

* cited by examiner

*Primary Examiner* — Bentsu Ro
(74) *Attorney, Agent, or Firm* — Hovey Williams LLP (57) ABSTRACT

A system and method for controlling a speed of a permanent magnet AC motor (38) based on a delay angle of a triac-controlled AC voltage signal (66) from a triac (34). A simulated load (54) connected to the triac (34) enables a load current and creates the signal (66). A first detector (48) detects a zero-crossing point of the AC voltage signal, and a second detector (50) detects a subsequent turn-on instance of the triac (34). A speed command generator (52) measures an interval between the zero-crossing point and the subsequent turn-on instance, and converts the delay angle to a speed command for controlling the speed of the motor (38). The simulated load (54) may include resistors (70) having a resistance which causes the load current to be below a holding current rating of the triac (34), thereby causing the triac (34) to turn off after the interval has been measured.

17 Claims, 11 Drawing Sheets

SYSTEM AND METHOD FOR USING AND CONTROLLING PERMANENT MAGNET AC MOTOR IN PLACE OF TRIAC-CONTROLLED PSC MOTOR

RELATED APPLICATION

The present U.S. non-provisional patent application is a continuation and claims priority benefit of a prior-filed U.S. non-provisional patent application having the same title, Ser. No. 15/435,050, filed Feb. 16, 2017, which claims the priority of Chinese Patent Application No. 201710043230.X, filed Jan. 19, 2017. The entire contents of the identified prior-filed applications are hereby incorporated by reference into the present application as if fully set forth herein.

FIELD

The present technology relates to systems and methods for using and controlling permanent magnet AC motors in place of triac-controlled PSC motors. More particularly, embodiments concern an adapter module for generating a motor speed command for a permanent magnet AC motor based on a delay angle of a triac, while also minimizing the temperature increase of the simulated load resistor through minimizing the triac conducting time.

BACKGROUND

Electronic devices, including consumer electronic devices, appliances, and the like, often use permanent split capacitor (PSC) motors. For example, many evaporative coolers use PSC motors to provide air ventilation. The motor speeds of PSC motors are typically controlled by triacs. When the conduction angle of a triac changes, the output voltage of the triac changes, and the speed of the motor changes. The larger the conduction angle of the triac, the faster the motor runs. So the speed of the motor can be adjusted from low speed to high speed by changing the speed setting on a user interface panel of the evaporative controller.

A triac is turned on (i.e., conducts current) by applying a control signal to a gate terminal. The gate signal is generated by a circuit in the evaporative controller. The instance along each half cycle of the alternating current (AC) voltage signal at which the gate signal is applied to the gate terminal of the triac makes the triac conduct at that instance. Hence, the gate signal uses the zero-crossing of the AC voltage signal as the reference to determine the triac turn-on instance. The AC voltage to the motor can be changed by varying the delay angle of the triac on each half of the AC voltage signal in order to change the speed of the motor.

When the gate signal is applied to the gate terminal of the triac, the triac conducts and current flows through the triac to the load which is the PSC motor. When the load current (IT) flowing through the load reaches the triac's latching current (IL), IT is maintained even after the gate signal is removed. Once the triac is conducting and the gate signal is removed, as long as IT continues to flow and is higher than the holding current (IH) rating of the triac, the triac will continue to conduct. The triac will continue conducting until IT falls below IH, which occurs at the zero-crossing of the sinusoidal AC voltage signal. The diminishing AC voltage signal on the positive and negative cycles causes IT to gradually diminish and eventually fall below IH, and the triac turns off. When the triac turns off, there is no AC voltage applied to the load and no power consumed by the load, and therefore no heat is generated.

Triac-controlled PSC motors have long been used in evaporative coolers and other applications. However, as technology has advanced and as permanent magnet AC motors have developed, the limitations of using PSC motors have become more pronounced. In particular, permanent magnet AC motors are more efficient, quieter, and smaller, their speed can be controlled more accurately, and they have better mechanical properties than PSC motors. As demands for greater efficiency have increased, and as the cost of using permanent magnet AC motors has decreased, it has become desirable to replace PSC motors with permanent magnet AC motors. However, a permanent magnet AC motor cannot be driven by a triac. Specifically, the varying conduction angle of the triac cannot be used directly to control the speed of the permanent magnet AC motor. To achieve variable speed, a motor controller is required, including to perform converter and inverter operations, wherein the AC input is converted to DC, and the motor controller provides a sinusoidal voltage to drive the permanent magnet AC motor.

This background discussion is intended to provide information related to the present technology which is not necessarily prior art.

SUMMARY

Embodiments of the present technology solve the above-described and other problems and limitations by providing a system and method for using and controlling a permanent magnet AC motor in place of a triac-controlled PSC motor. The system and method includes an adapter module for generating a motor speed command for the permanent magnet AC motor based on a delay angle of a triac, while also minimizing the temperature increase of the simulated load resistor through minimizing the triac conducting time.

In an embodiment of the present technology, a system is provided for controlling a motor speed of a permanent magnet AC motor based on a delay angle of a triac-controlled AC voltage signal from a triac. The system may broadly comprise a simulated load, a zero-crossing detector, a turn-on instance detector, and a speed command generator. The simulated load may be connected to the triac and may enable a load current to flow through the triac to the simulated load and may create the triac-controlled AC voltage signal. The zero-crossing detector may detect a zero-crossing point of an AC voltage signal from a wall outlet. The turn-on instance detector may detect a subsequent turn-on instance of the triac, wherein the turn-on instance may be the instance at which the triac changes from non-conduction to conduction. The speed command generator may measure a time interval between the zero-crossing point and the subsequent turn-on instance, wherein the time interval corresponds to the delay angle, convert the delay angle to the motor speed command, and communicate the motor speed command to a motor controller for controlling the motor speed of the permanent magnet AC motor.

In another embodiment of the present technology, a method is provided for controlling a motor speed of a permanent magnet AC motor based on a delay angle of a triac-controlled AC voltage signal from a triac. The method may broadly comprise the following steps. A simulated load may be connected to the triac to enable a load current to flow through the triac to the simulated load and to create the triac-controlled AC voltage signal. A zero-crossing point of an AC voltage signal from a wall outlet may be detected. A subsequent turn-on instance of the triac may be detected, wherein the turn-on instance may be the instance at which the triac changes from non-conduction to conduction. A time interval between the zero-crossing point and the subsequent turn-on instance may be measured, wherein the time interval corresponds to the delay angle. The delay angle may be converted to the motor speed command, and the motor speed command may be communicated to a motor controller for controlling the motor speed of the permanent magnet AC motor.

Various implementations of the foregoing embodiments may include any one or more of the following additional features. The present technology may be incorporated into an evaporative cooler having the permanent magnet AC motor in place of a PSC motor. Converting the delay angle to the motor speed command may be based on a minimum delay angle and a corresponding maximum selectable motor speed and a maximum delay angle and a corresponding minimum selectable motor speed. The speed command generator may be implemented by a microprocessor having a timer, wherein the timer may measure the time interval between the zero-crossing signal and the subsequent turn-on instance. The turn-on instance of the triac may manifest as a falling edge or a rising edge on each half of the triac-controlled AC voltage signal.

The simulated load may include a plurality of resistors connected in series, and the resistance of these resistors may cause the load current to be below a holding current rating of the triac, thereby causing the triac to turn off after the triac is turned on and the time interval between the zero-crossing point and the subsequent turn-on instance is measured. An isolated DC power may be supplied by the motor controller for powering the adapter module. A DC-to-DC converter may receive the isolated DC power and provide DC power for powering the zero-crossing detector, the turn-on instance detector, and the speed command generator. A universal asynchronous receiver/transmitter may communicate the motor speed command to the motor controller.

This summary is not intended to identify essential features of the present technology, and is not intended to be used to limit the scope of the claims. These and other aspects of the present technology are described below in greater detail.

DRAWINGS

Embodiments of the present technology are described in detail below with reference to the attached drawing figures, wherein.

The figures are not intended to limit the present technology to the specific embodiments they depict. The drawings are not necessarily to scale.

DETAILED DESCRIPTION

Broadly characterized, embodiments of the present technology provide a system and method for using and controlling a permanent magnet AC motor in place of a triac-controlled PSC motor. For example, PSC motors are widely used in evaporative coolers but PSC motors have relatively low efficiency, so embodiments of the present technology allow for using higher efficiency permanent magnet AC motors in place of the PSC motors. The system and method includes an adapter module for generating a motor speed command for the permanent magnet AC motor based on a delay angle of a triac, while also minimizing the temperature increase of the simulated load resistor through minimizing the triac conducting time.

Figure 1:
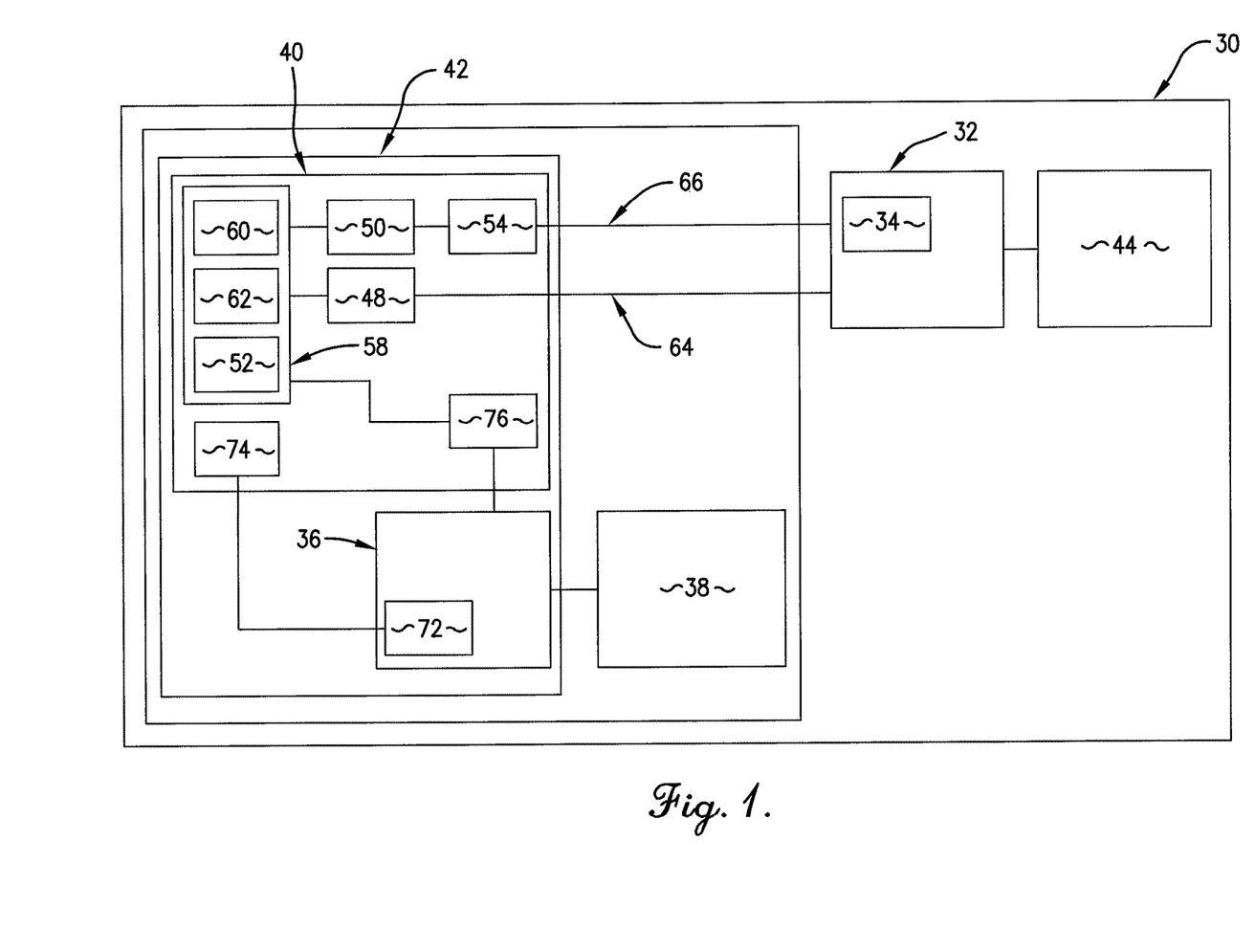
FIG. 1 is a block diagram of an evaporative cooler including an embodiment of the present technology which allows for using and controlling a permanent magnet AC motor in place of a triac-controlled PSC motor.

As seen in FIG. 1, an exemplary evaporative cooler (30), which may be used to cool air through evaporation of water, may include an evaporative controller (32) including a triac (34), a motor controller (36), a permanent magnet AC motor (38), and the adapter module (40) which facilitates the use of the permanent magnet AC motor (38) in place of a more conventional PSC motor. In operation, the adapter module (40) receives a speed control signal from the evaporative controller (32), and generates a speed command signal for the motor controller (36) to drive the permanent magnet AC motor (38) at a desired speed to achieve a desired air flow and room temperature. The adapter module (40) may be located inside a motor controller housing (42) which may also contain the motor controller (36).

Figure 2:
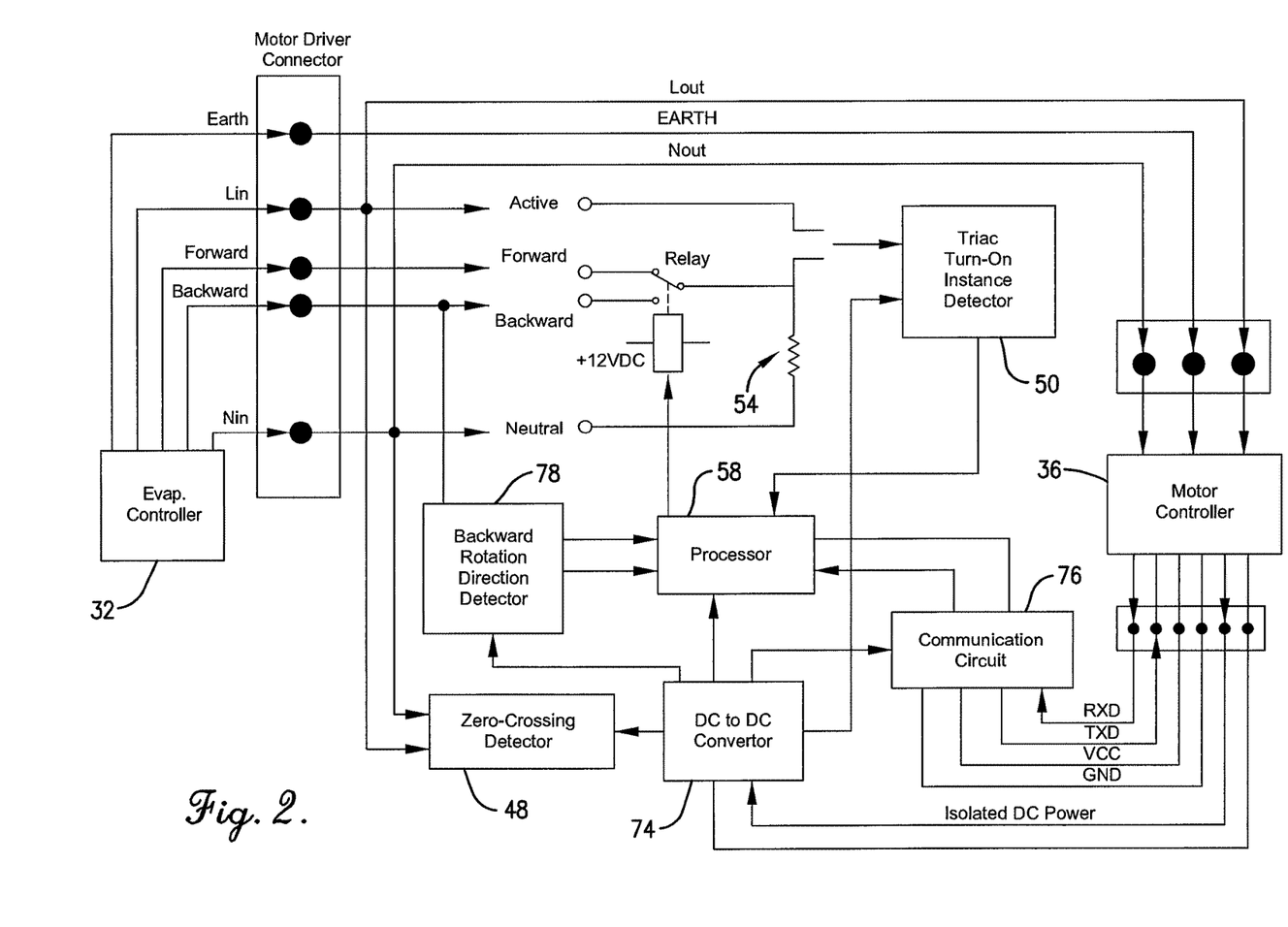
FIG. 2 is a block diagram of components of the evaporative cooler of FIG. 1, including an embodiment of an adapter module which allows for using and controlling the permanent magnet AC motor.

Referring also to FIG. 2, an embodiment of the adapter module (40) may broadly include a zero-crossing detector (48), a turn-on instance detector (50), a speed command generator (52), and a simulated load (54). In one implementation, at least some of the functionality of the adapter module (40), such as the speed command generator (52), may be implemented by a microprocessor (58) having or having access to a timer (60), an input capture feature which may be able to generate an interrupt, and a non-volatile memory (62), and executing software which facilitates or performs some or all of the steps associated with the functionality. Alternatively, an analog circuit may be used in place of the microprocessor.

Figure 3:
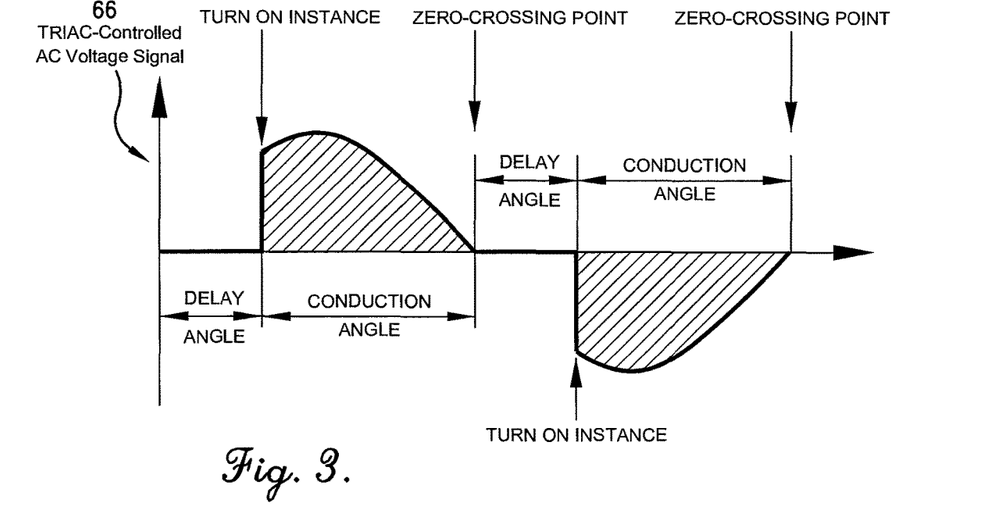
FIG. 3 is a graphical illustration of a triac conduction angle and a delay angle.

Broadly, the zero-crossing detector (48) detects a zero-crossing point of an AC voltage signal (from, e.g., a wall outlet, possibly via the evaporative controller (32)), and the turn-on instance detector (50) detects a subsequent turn-on instance of the triac (34). The interval between the zero-crossing point and the turn-on instance may be determined, and this interval between these two signals may be converted to the delay angle. The speed command generator (52) uses the delay angle to generate the speed command which drives the motor (38). An exemplary triac-controlled AC voltage signal (66) from the triac (34) is shown in FIG. 3, wherein the turn-on instance is the instance at which the triac (34) changes from non-conduction to conduction. The delay angle is the time interval from the zero-crossing point to the turn-on instance. After the triac (34) is turned on, an AC voltage may be applied to the load (54) for the remainder of the AC line cycle, which is the conduction angle of the triac (34).

In more detail, the speed control signal from the evaporative controller (32) may be the triac-controlled AC voltage signal (66) from the triac (34). This signal (66) changes if the turn-on instance of the triac (34) changes when a command is received (from, e.g., the user interface (44)) to change the speed of the motor (38). The output voltage from the triac (34) may be based on the conduction angle of the triac (34): The larger the conduction angle, the higher the voltage in each half of the triac-controlled AC voltage signal (66), and therefore the higher the motor speed. An input capture interrupt may be triggered by each rising and falling edge of the signal from the turn-on instance detector (50). In the interrupt service routine, the timer (60) may be used to measure the interval between the zero-crossing signal and the subsequent turn-on instance. The timer counter may be programmed to increase automatically when the microprocessor (58) is running. At the rising or falling edge of the zero-crossing signal, the timer (60) may be cleared and enabled. At the falling edge of the triac operation signal, the timer counter value may be read by the microprocessor (58). Thus, the timer counter value reflects the time duration of the delay angle, and the speed command value is inversely proportional to the timer counter value. The speed command generator (52) converts the time duration of the delay angle to a motor speed, and a corresponding motor speed command may be sent to the motor controller (36).

It will be appreciated that the evaporative controller (32) may be designed by any of a number of different vendors, and different evaporative controllers may have different sets of minimum and maximum delay angles. These two parameters—the minimum and maximum delay angles and the corresponding maximum and minimum selectable motor speeds—may be measured and saved in the memory (62). The speed command generator (52) may then use the saved minimum and maximum delay angles and the corresponding maximum and minimum motor speeds to compute and generate the desired motor speed command, thereby accounting for the design of the particular evaporative controller being used.

The simulated load (54) may be connected to the output of the triac (34) component of the evaporative controller (32). The simulated load (54) emulates a PSC motor (which has been replaced with the permanent magnet AC motor (38)) in order to ensure proper operation of the triac (34). Without the simulated load (54), the triac-controlled AC voltage signal (66) which is the only control signal from the evaporative controller (32) would be lost and the adapter module (40) would not function. In more detail, the simulated load (54) acts as a load to the triac (34) such that when the triac (34) turns on IT passes through the triac (34) to the simulated load (54). The triac (34) will be latched on when the gate signal is applied.

Figure 4:
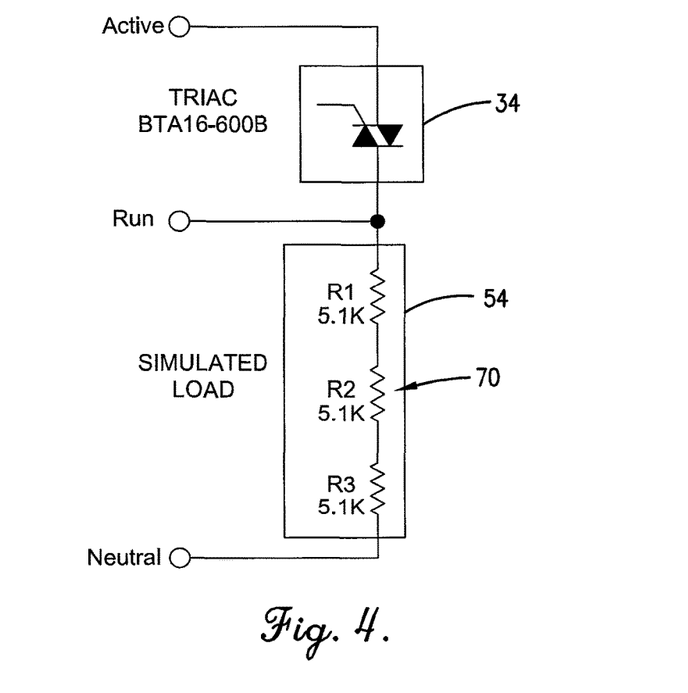
FIG. 4 is a schematic of an embodiment of a simulated load component of the adapter module of FIG. 2.

In one implementation, seen in FIG. 4, the simulated load (54) may include a plurality of power grade resistors (70) connected in series. Alternatively, the simulated load may be implemented using substantially any suitable resistor, capacitor, inductor, or combination thereof, and/or other components. In FIG. 4, "NEUTRAL" is connected to the neutral wire of the evaporative controller (32); "ACTIVE" is connected to the live wire of the evaporative controller (32); and "RUN" is connected to the output of the triac (34). In one implementation, the input voltage of the adapter module (40) may be 240 VAC. Alternatively, the input voltage may be substantially any suitable voltage such as 110 VAC or 220 VAC or another voltage with appropriate changes to the simulated load and other parameters.

The resistance of the simulated load resistors (70) may be selected to enable IT to be smaller than the IH rating of the triac (34) so that the triac (34) is turned off when the gate signal is removed. The turn-on instance may be captured by the turn-on instance detector (50). With the turn-on instance and zero-crossing signal captured, the speed command to the motor controller (36) to drive the motor (38) can be generated. With the triac (34) turning off immediately after it is turned on, the voltage applied to the simulated load resistors (70) may be reduced, which significantly reduces the power wastage and the heat generated in the simulated load resistors (70), and thereby significantly improves the efficiency and reliability of the evaporative cooler (30) when using the permanent magnet AC motor (38) rather than a PSC motor.

In various implementations, the adapter module (40) may further include any one or more of the following components. The motor controller (36) may be powered by an AC input power supply (from, e.g., a wall outlet) and generate an isolated DC power supply to power the adapter module (40). This DC power generated by the motor controller (36) may be +12 VDC or substantially any other suitable value. A power isolation module (72) on the motor controller (36) may generate isolated DC power for the adapter module (40). A DC-to-DC converter (74) may provide DC power for the detectors (48,50) and the speed command generator (52). This DC power generated by the DC-to-DC converter (74) may be +3.3 VDC or substantially any other suitable value. A communication component (76) may communicate the motor speed command to the motor controller (36) using UART communication. The motor controller (36) may include an optical coupler, such as SFH6156-2T, to provide electronic isolation for the UART communication. Alternatively, the motor speed command may be delivered using substantially any other suitable means, such as SPI communication, I2C communication, a PWM signal, or even an analog signal. A backward rotation detector (78) which detects backward rotation of the motor (38).

As mentioned, the simulated load (54) provides a conducting path to allow current passing through the triac (34) to be larger than the IH rating for the triac (34) so that the triac (34) remains turned on even when the gate signal is removed. However, with the triac (34) operating in this manner, a significant amount of heat may be generated in the simulated load (54), especially if the evaporative cooler (30) is operated for extended periods of time in the summer. Additionally, if the adapter module (40) is located in the housing (42), which may have limited space and poor ventilation, the heat trapped inside the housing (42) can cause reliability issues with the adapter module (40) and/or the motor controller (36). Thus, if the triac (34) is allowed to turn on and remain on, and if the current passing through the triac (34) after it is turned on is maintained at larger than IH, the resulting heat could be problematic. In order to minimize heat generation in the simulated load (54), once the turn-on instance with respect to the previous AC voltage zero-crossing point is detected by the detectors (48,50), the triac (34) may be forced to turn off. As a result, the triac (34) may only be turned on for a minimum amount of time in each half of the AC line voltage cycle, which helps to minimize energy wastage and heat generation.

In more detail, if the resistance value of the simulated load resistors (70) is too small, IT flowing through the triac (34) will exceed IH and the triac (34) will continue conducting even after the gate signal is removed. For example, if the triac (34) is a BTA16-600B triac, the holding current is 50 mA, and the maximum power dissipation of the simulated load is:

$$P\_(\text{Simulated Load}) = U\_\text{Input} * I\_(\text{Holding Current}) = 240 \text{ VAC} * 0.05 \text{ A} = 12 \text{ W} \quad (1)$$

From equation (1), with a power dissipation of 12 W, the temperature of the simulated load (54) will be relatively high and power is wasted as generated heat. To handle 12 W power dissipation, a simulated load resistor rated for a higher power may be used, but the size of such a resistor may be too large for the limited space available in the housing (42). Thus, in order to reduce the power dissipation of the simulated load (54), the value of the simulated load resistor may be increased, thereby reducing IT. When IT is less than IH for the triac (34), the triac (34) will be in the conducting state only when there is gate signal, so if the gate signal is removed, the triac (34) will be turned off.

Figure 5:
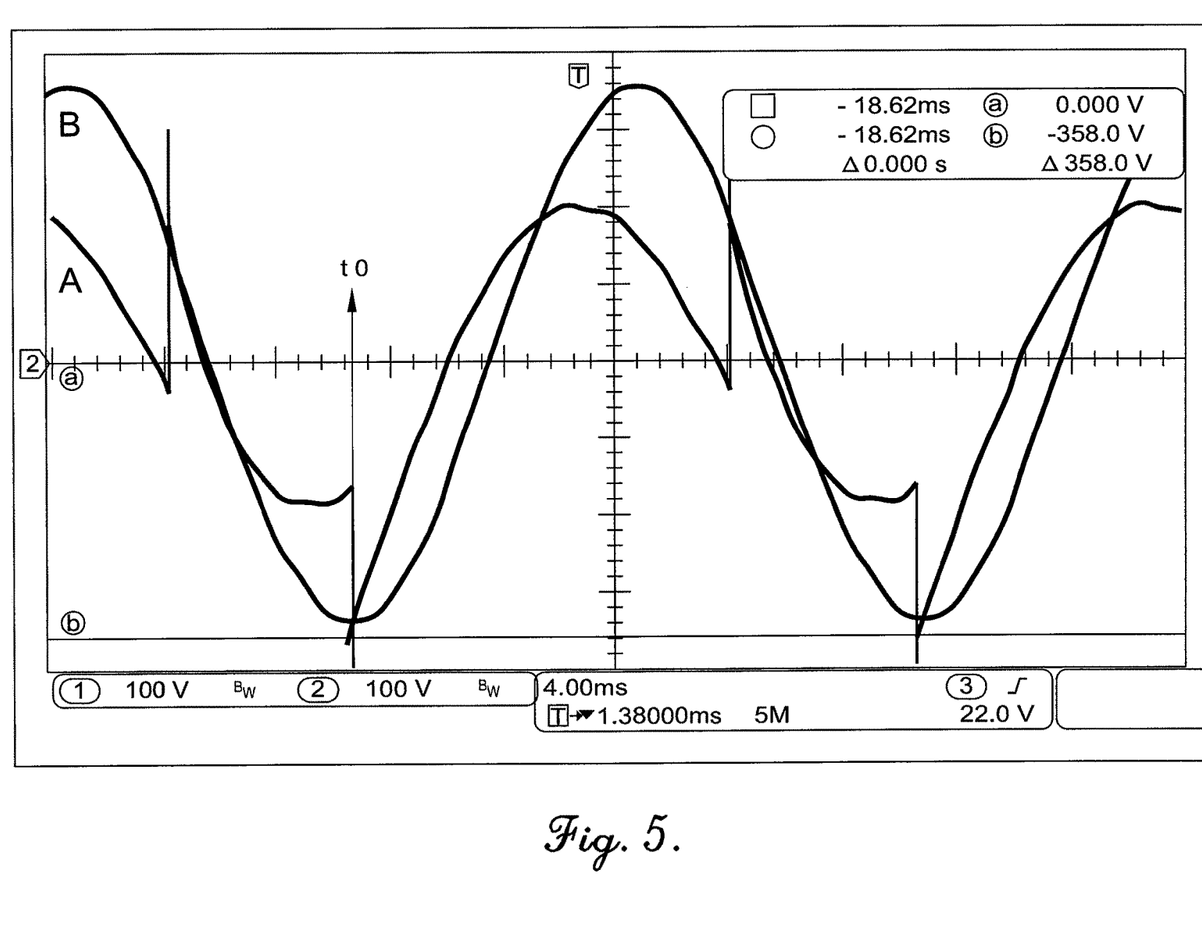
FIG. 5 is a triac output voltage waveform when the triac has a maximum load current.

When the triac (34) is triggered to turn on, if the delay angle is changing, the instantaneous IT is also changing accordingly. FIG. 5 shows the output voltage of the triac controller which results from the maximum instantaneous IT. The waveform labelled "A" is the output voltage of the triac controller, and the reference of waveform A is "NEUTRAL." Waveform A is also the voltage waveform between the two points of the simulated load (54). The waveform labelled "B" is the AC input voltage, and the reference of B is "NEUTRAL." The instance labelled "t0" is the instance at which the triac (34) is triggered. In FIG. 5, the maximum instantaneous voltage across the simulated load (54) is 358V, and the corresponding maximum instantaneous IT is:

$$I\_(\text{Load Current}) = U\_(\text{RUN-NEUTRAL})/(R\_1 + R\_2 + R\_3) = 358 \text{V}/(5.1 \text{ K}\Omega + 5.1 \text{ K}\Omega + 5.1 \text{ K}\Omega) = 23.4 \text{ mA} \quad (2)$$

Figure 6:
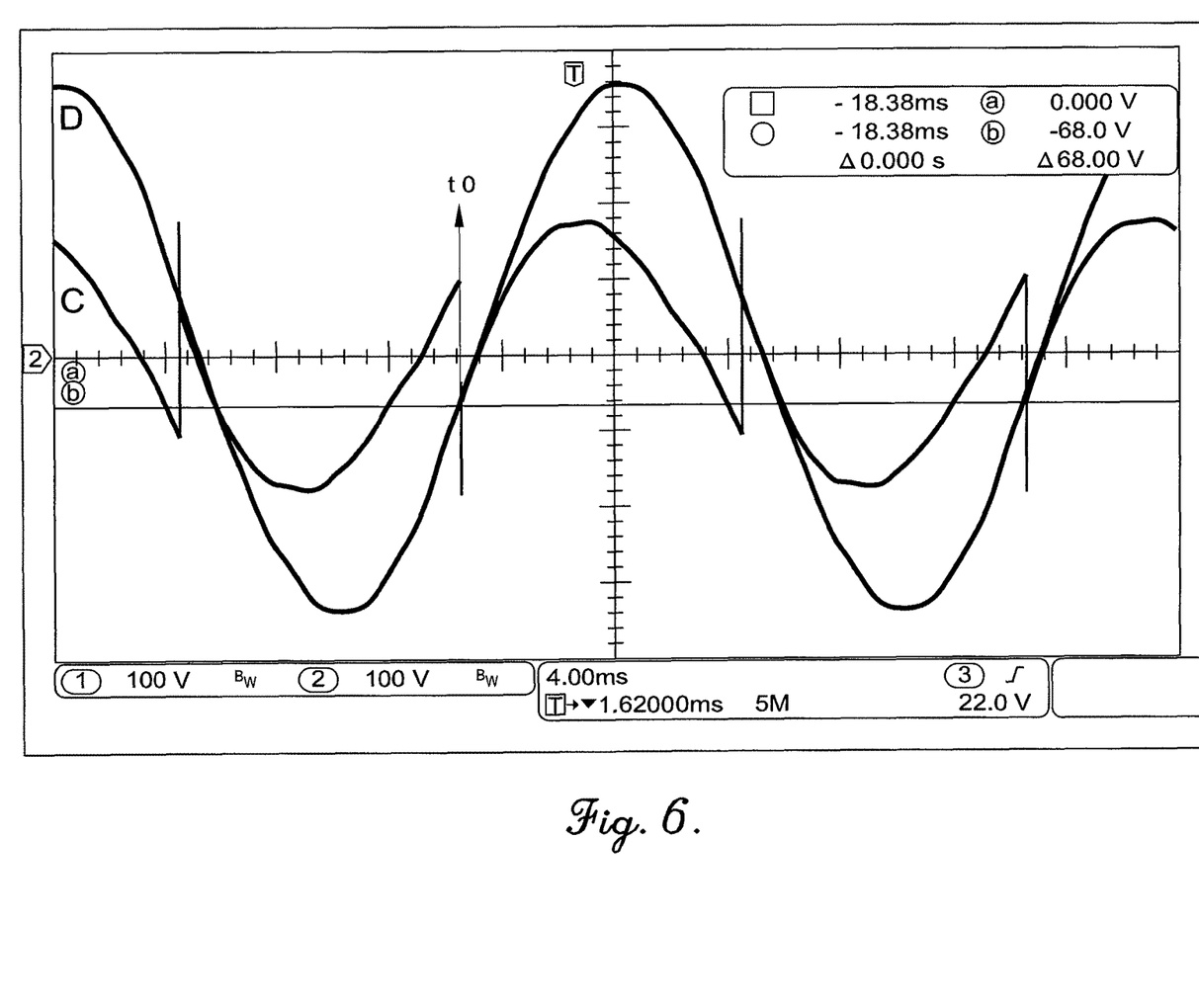
FIG. 6 is the triac output voltage waveform when the triac has a minimum load current.

FIG. 6 shows the output voltage of the triac controller which results from the minimum instantaneous IT. The waveform labelled "C" is the output voltage of the triac controller, and the reference of waveform C is "NEUTRAL." Waveform C is also the voltage waveform between the two points of the simulated load (54). The waveform labelled "D" is the AC input voltage, and the reference of waveform D is "NEUTRAL." The instance labelled "t0" is the instance at which the triac (34) is triggered. In FIG. 6, the minimum instantaneous voltage across the simulated load (54) is 68V, and the corresponding minimum instantaneous IT is:

$$I\_(\text{Load Current}) = U\_(\text{RUN-NEUTRAL})/(R\_1 + R\_2 + R\_3) = 68 \text{V}/(5.1 \text{ K}\Omega + 5.1 \text{ K}\Omega + 5.1 \text{ K}\Omega) = 4.45 \text{ mA} \quad (3)$$

Figure 7:
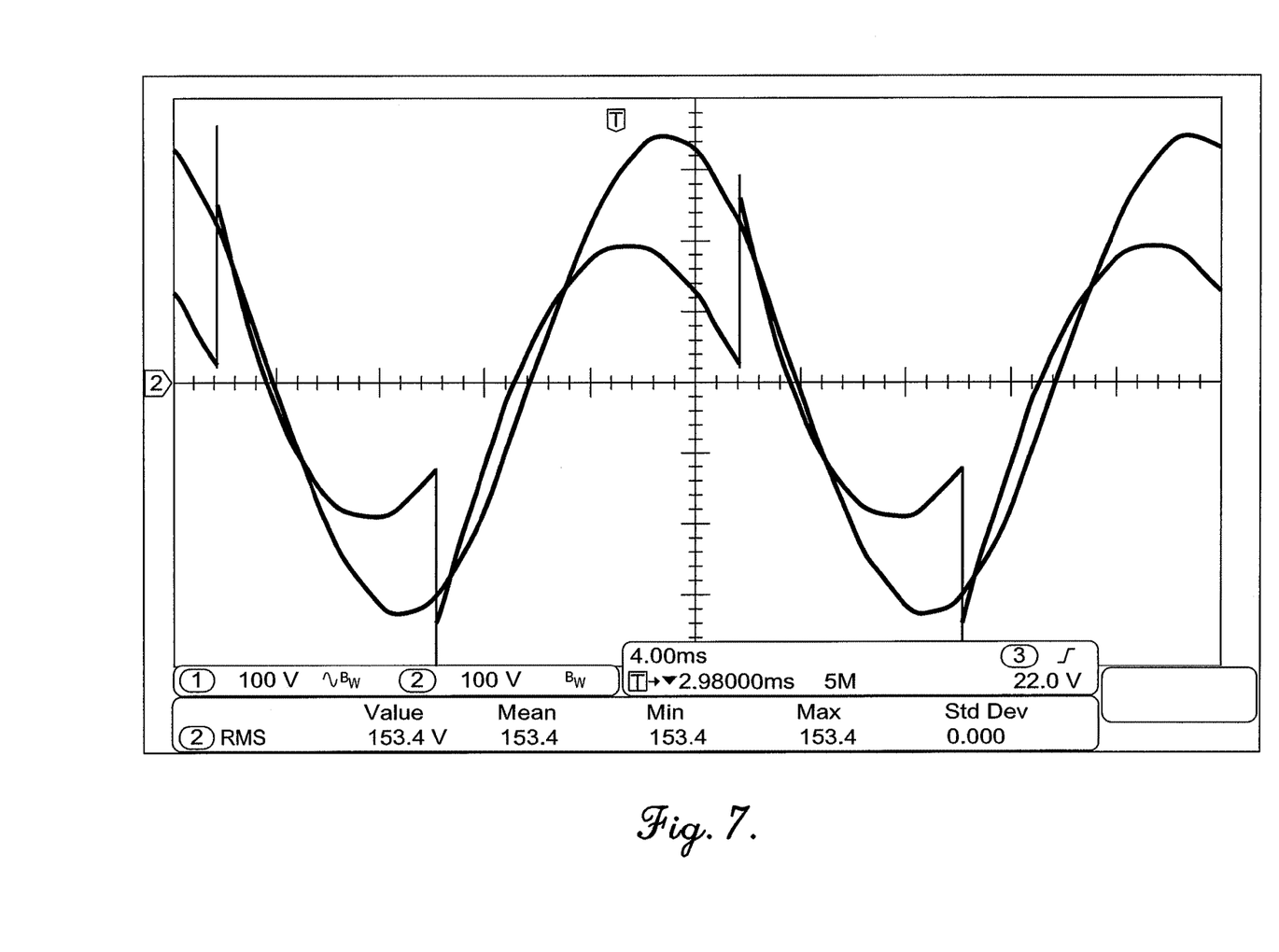
FIG. 7 is the triac output voltage waveform when the simulated load has a maximum power dissipation.

When the RMS voltage of the simulated load (54) reaches maximum, the power dissipation on the 15.3 k simulated load resistor (54) will be at maximum power dissipation. The voltage of the simulated load (54) is shown in FIG. 7. The power dissipation of the simulated load (54) is:

$$P\_(\text{Simulated Load}) = (U\_(\text{Simulated Load})^2)/(R\_1 + R\_2 + R\_3) = (153.4 \text{VRMS})^2/(5.1 \text{K}\Omega + 5.1 \text{K}\Omega + 5.1 \text{K}\Omega) = 1.54 \text{ Watts} \quad (4)$$

From equations (2) and (3), it can be shown that the IT is always less than the IH of 50 mA (or 0.05 A) specified in equation (1). So when the gate signal is removed, the triac (34) is turned off. Thus, with proper selection of the resistance of the simulated load (54), the triac (34) can be forced to turn off after it is turned on. Thus, the simulated load resistors (70) significantly lower the heat that would otherwise be generated, and have relatively small wattage and size, and small size allows them to more easily fit inside the housing (42). Further, less generated heat results in lower ambient temperature for the adapter module (40) and the motor controller (36), which can improve reliability.

It will be appreciated that the adapter module (40) is sufficiently flexible to operate with a wide range of different triacs in evaporative controllers built by different vendors. If a different triac is used, then the simulated load (54), especially the resistance of the resistors (70), may also be changed according to the IH of the particular triac.

Figure 8:
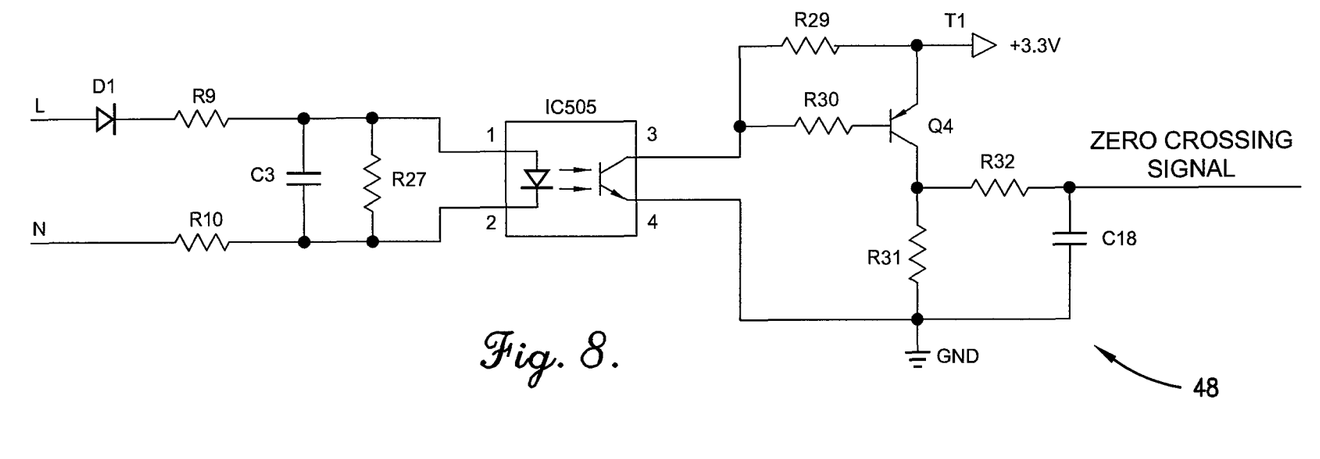
FIG. 8 is a schematic of a zero-crossing detector component of the adapter module of FIG. 2.
Figure 9:
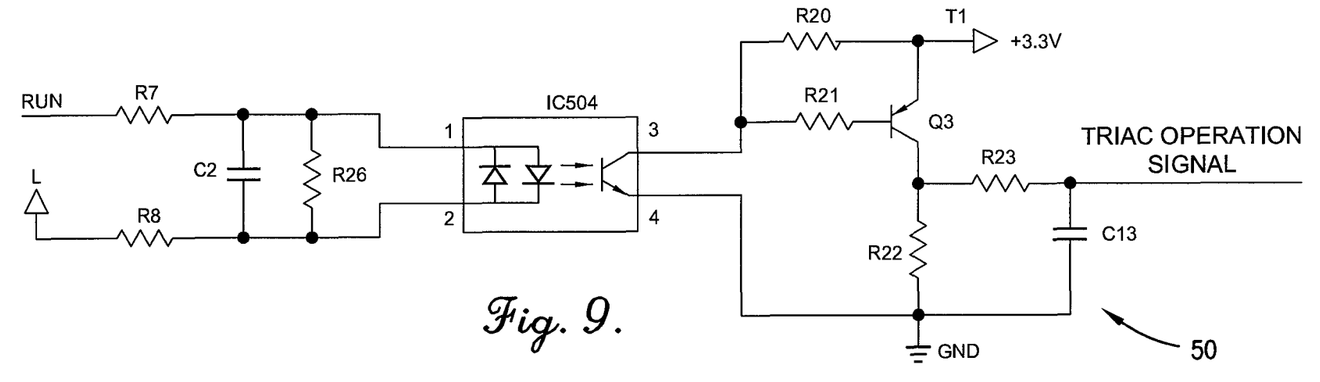
FIG. 9 is a schematic of a turn-on instance detector component of the adapter module of FIG. 2.

Referring to FIG. 8, one possible implementation of the zero-crossing detector (48) is shown for converting the 240 VAC input voltage to pulses, and for delivering the resulting signal to an input capture pin of the microprocessor (58). Referring to FIG. 9, one possible implementation of the turn-on instance detector (50) is shown for converting the triac-controlled AC voltage signal (66) to pulses, and for delivering the resulting signal to an input capture pin of the microprocessor (58). Both detectors (48,50) may include AC and DC portions. The DC portions of the circuits which connect to the microprocessor (58) may be isolated from the AC portions using opto-couplers in order to enhance safe operation between the adapter module (40) and the evaporative controller (32).

Figure 10:
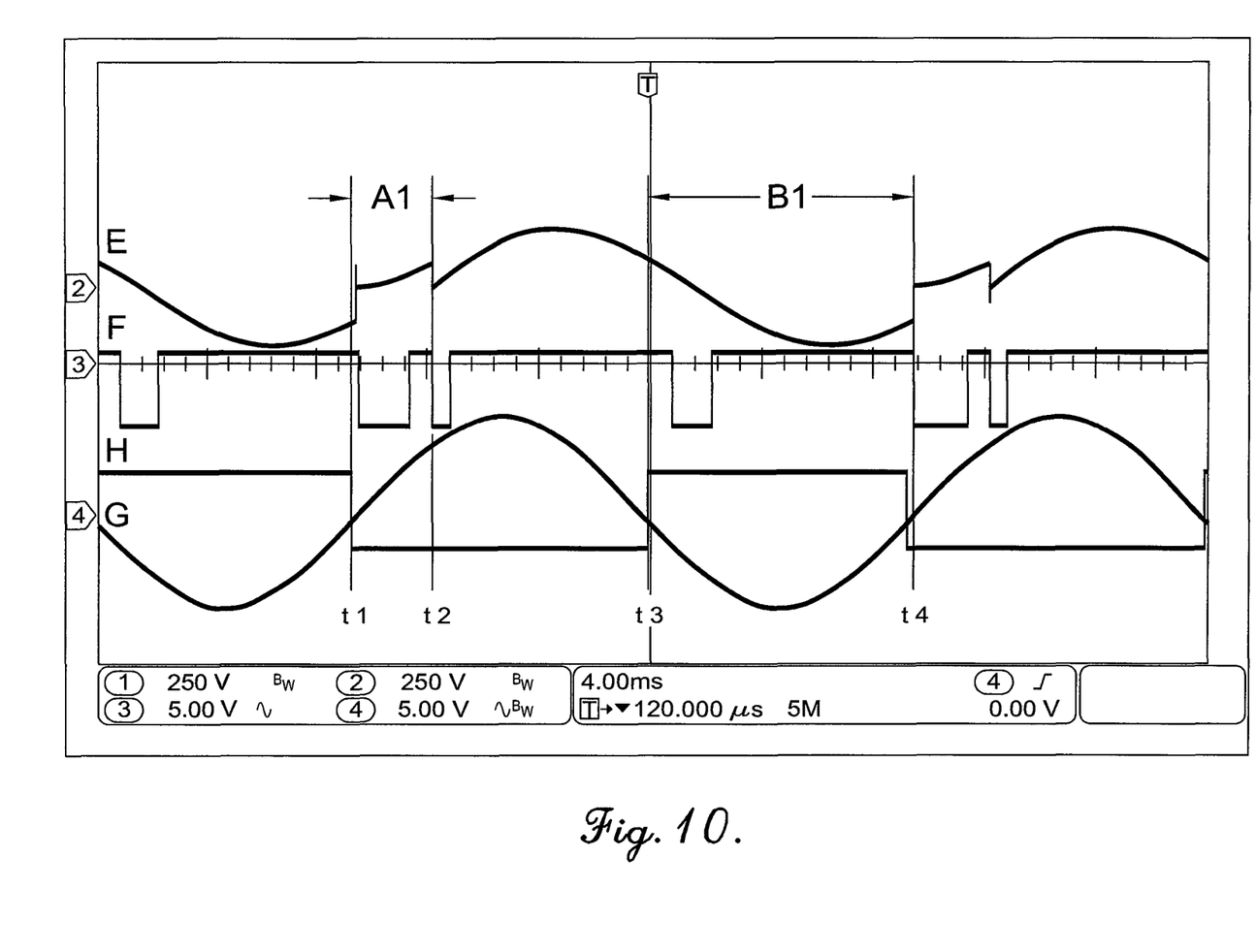
FIG. 10 is a triac operation and zero-crossing waveform when the triac has a minimum delay angle.

An exemplary method of generating the delay angle may proceed substantially as follows. Referring to FIG. 10, the zero-crossing and turn-on signals are shown when the delay angle is at a minimum. The triac-controlled AC voltage waveform is labelled "E," and is measured between "RUN" and "ACTIVE" points on the evaporative controller (32). The waveform labelled "F" is derived from waveform E by converting the signal of waveform E, which is an AC line voltage, to a low level voltage which is acceptable to the microprocessor. Waveform F contains information to measure the delay angle. The waveform labelled "G" is the AC input voltage between "ACTIVE" and "NEUTRAL." The waveform labelled "H" is the pulses converted from the AC input voltage to the low level voltage acceptable to the microprocessor (58).

In a first step, the microprocessor pins which accept the zero-crossing and turn-on signals are configured to be input capture pins during the power-up initialization of the microprocessor (58). An interrupt may be generated at the rising and falling edges of the zero-crossing signal. Similarly, an interrupt may be generated at the rising and falling edges occurring on the turn-on signal.

In a second step, when the zero-crossing interrupt may be generated (regardless of whether it is a falling edge or rising edge), it sets a zero-crossing flag variable to "True" in order to cause an enable interrupt on the turn-on signal pin, and to reset the timer counter which may be used to measure the interval between the turn-on instance and the previous zero-crossing. As long as the zero-crossing flag variable value is "True", the microprocessor (58) captures the first rising edge of the triac operation signal and both set another flag to "True" to indicate the rising edge has been detected, and change the input capture interrupt on the turn-on signal pin to respond to detecting a falling edge. The microprocessor (58) waits for the falling edge on the triac operation signal to be detected. When the falling edge is detected, the counter value may be read. Based on the time interval of the pulse width A1 and B1 indicated in FIG. 10 with respect to the previous zero-crossing point, software running on the microprocessor determines the valid delay angle. A1 is the time duration from t1 to t2, while B1 is the time duration from t3 to t4.

In a third step, the validity of the delay angle information may be determined based on the following criteria. A1 and B1 must be less than 8 ms. If A1 or B1 is larger than 8 ms, it is regarded as the triac turn-off signal. If the counter value is less than a specific minimum value including zero, it is considered a fault signal. If the first two criteria are not satisfied, a valid delay angle is indicated. The microprocessor (58) compares the interval of A1 and B1 and takes the smaller value. In FIG. 10, A1 is the correct delay angle. For the triac turn-off signal, the time duration is not limited to 8 ms. For different types of triacs and frequencies of the AC input voltage, the time duration may be varied accordingly.

In a fourth step, Steps 2 and 3 are continuously repeated as long as the motor (38) is running. The valid delay angle readings are kept in the microprocessor memory (62), and the average of these readings may be computed to ensure a steady and smooth delay angle.

Figure 12:
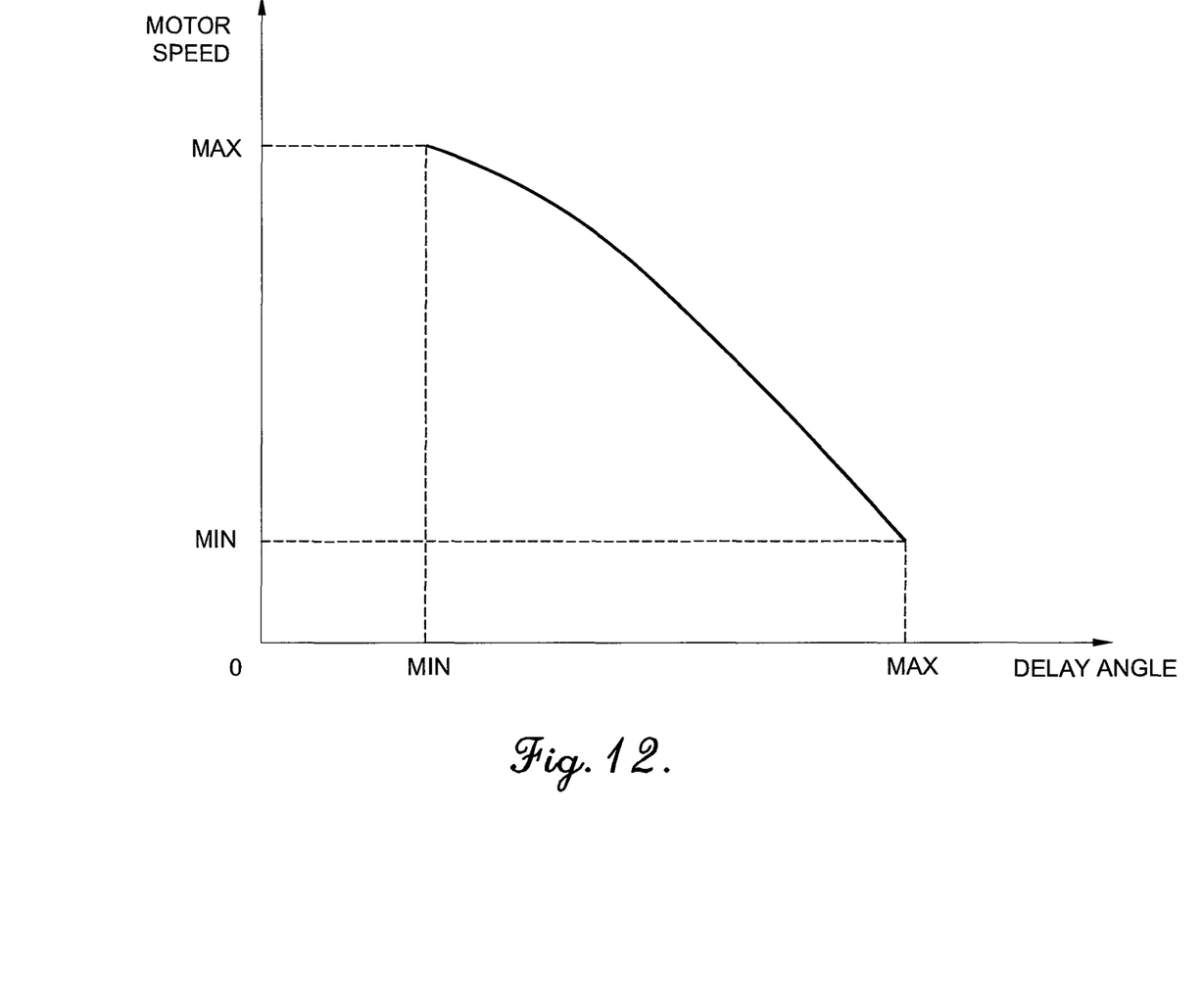
FIG. 12 is a graphical illustration of a relationship between a delay angle and a motor speed.

In a fifth step, the parameters illustrated in claim 10 are used to convert the delay angle into the speed information. The result is illustrated in FIG. 12, and the relationship between the delay angle and the motor speed reflected in this curve may be used to generate the motor speed command. The exemplary curve shown in FIG. 12 is only for illustration purposes.

Figure 11:
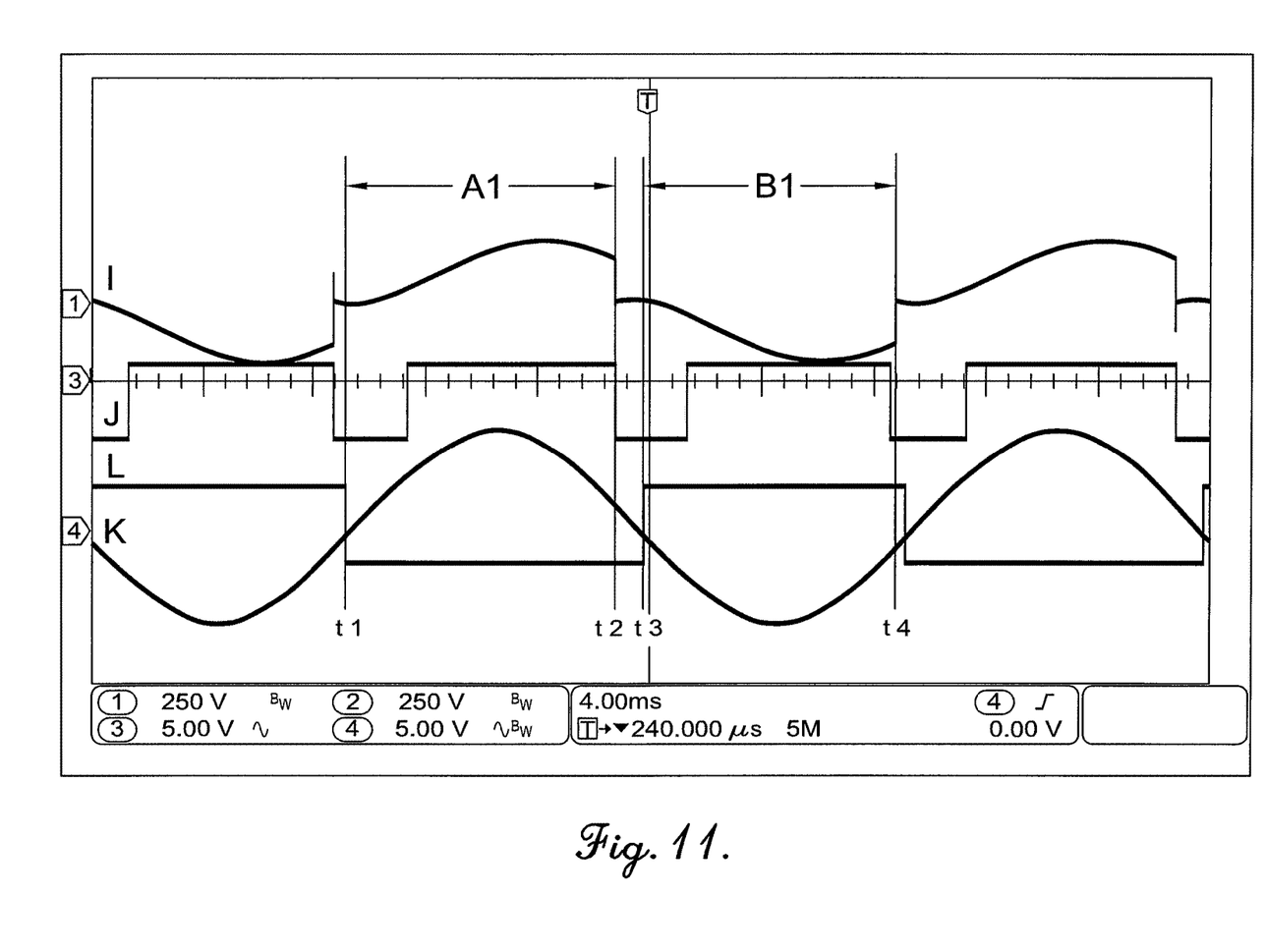
FIG. 11 is a triac operation and zero-crossing waveform when the triac has a maximum delay angle.

In a sixth step, the motor speed command may be sent to the motor controller (36). The triac operation waveform and zero-crossing signal is shown in FIG. 11 when the delay angle is at a maximum. The triac-controlled AC voltage waveform is labelled "I," and is measured between the "RUN" and "ACTIVE" points on the evaporative controller (32). The waveform labelled "J" is derived from waveform I by converting the signal of waveform I, which is an AC line voltage, to a low level voltage which is acceptable to the microprocessor (58). This signal contains the delay angle information. The waveform labelled "K" is the AC input voltage between "ACTIVE" and "NEUTRAL." The waveform labelled "L" is the pulses converted from the AC input voltage to a low level voltage acceptable to the microprocessor (58).

Figure 13:
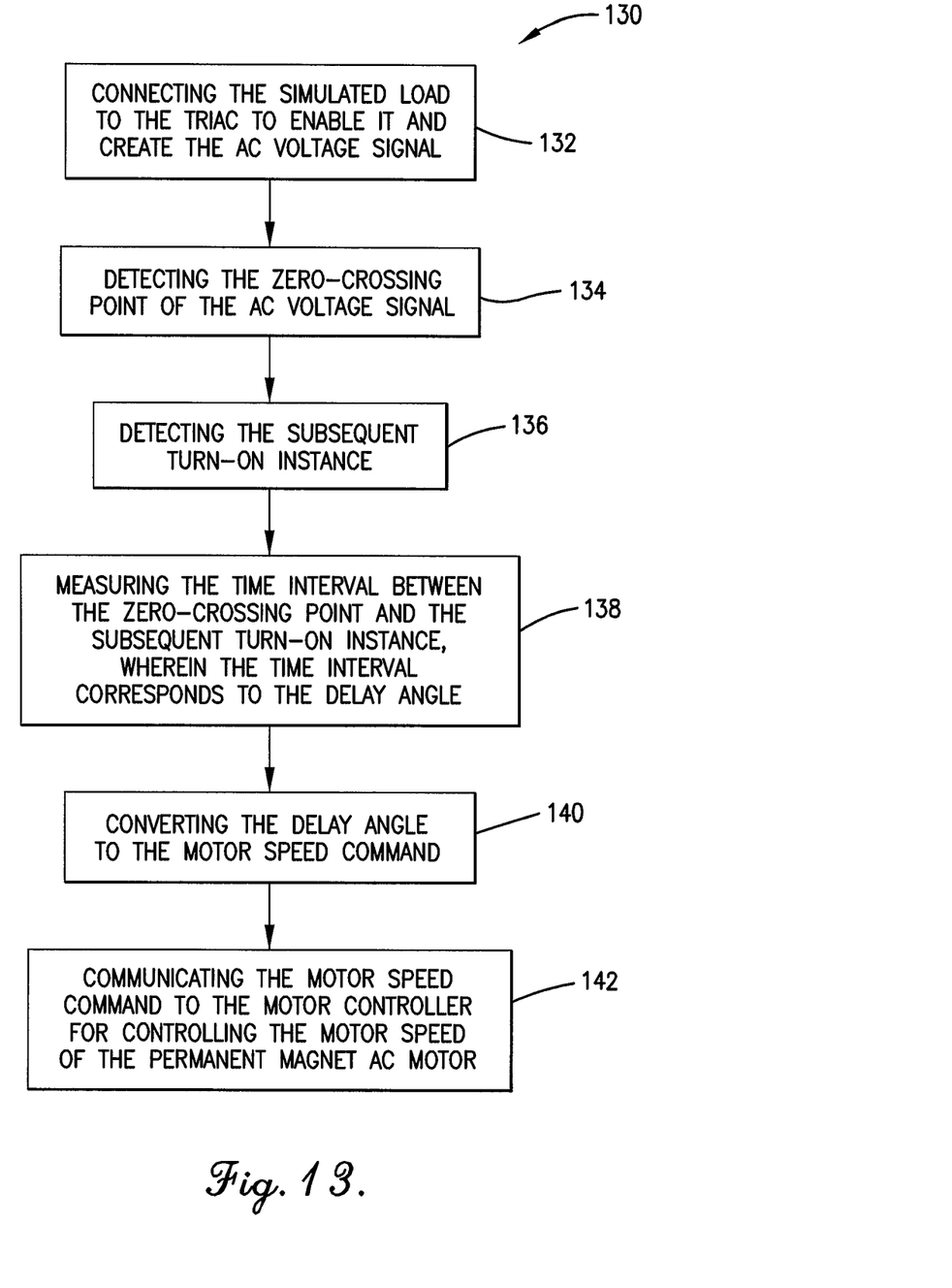
FIG. 13 is a flowchart of steps performed by the embodiment of the adapter module of FIG. 2 which allows for using and controlling the permanent magnet AC motor.

Referring to FIG. 13, a high-level flowchart is shown summarizing an embodiment of a method 130 including at least some of the steps performed by the adapter module (40). Broadly, the simulated load (54) may be connected to the triac (34) to enable IT to flow through the triac (34) to the simulated load (54) and to create the triac-controlled AC voltage signal (66), as shown in 132. The simulated load (54) may include the plurality of resistors (70) connected in series, and the resistances of these resistors (70) may be chosen to cause IT to be below the IH rating of the triac (34), thereby causing the triac (34) to turn off after the triac (34) is turned on and the time interval between the zero-crossing point and the subsequent turn-on instance is measured.

The zero-crossing point of the AC voltage signal through the zero-crossing detector (48) may be detected, as shown in 134. The subsequent turn-on instance of the triac (34) may be detected, as shown in 136. The time interval between the zero-crossing point and the subsequent turn-on instance may be determined, wherein the time interval corresponds to the delay angle, as shown in 138. The delay angle may be converted to the motor speed command, as shown in 140. Converting the delay angle to the motor speed command may be based on the minimum delay angle and the corresponding maximum selectable motor speed and the maximum delay angle and the corresponding minimum selectable motor speed. The motor speed command may then be communicated to the motor controller (36) for controlling the motor speed of the permanent magnet AC motor (38), as shown in 142. The steps of measuring the time interval, determining the motor speed command, and communicating the motor speed command may be performed by the microprocessor (58) having the timer (60). In particular, the time interval between the zero-crossing signal and the subsequent turn-on instance may be measured by the timer (60).

The preceding descriptions of embodiments of the technology are intended to describe aspects of the invention in sufficient detail to enable those with ordinary skill in the art to practice the invention. Other embodiments may be utilized and changes may be made without departing from the scope of the claims. The preceding descriptions are, therefore, not limiting. The scope of the present technology is defined only by the appended claims, along with the full scope of equivalents to which such claims are entitled.

Separate references to an "embodiment" and an "implementation" in this description do not necessarily refer to the same or a different embodiment or implementation and are not mutually exclusive unless so stated. Specifically, a feature, structure, action, etc. described in one embodiment or implementation may or may not also be included in other embodiments or implementations. Further, as used herein, the terms module, control module, controller, and the like may refer to an application specific integrated circuit (ASIC), an electronic circuit, a processor (shared, dedicated, or group) and memory that execute one or more software or firmware programs, a combinational logic circuit, and/or other suitable components that provide the described functionality.

Having thus described one or more embodiments of the invention, what is claimed as new and desired to be protected by Letters Patent includes the following:

1. A system for controlling a motor speed of an AC motor based on a delay angle of a triac-controlled AC voltage signal from a triac, the system comprising:
   a simulated load configured to be connected to the triac to enable a load current to flow through the triac to the simulated load and to create the triac-controlled AC voltage signal;
   a turn-on instance detector configured to detect a turn-on instance of the triac when the triac changes from non-conduction to conduction; and
   a speed command generator configured to—
      measure a time interval between a zero-crossing point of an AC voltage signal and the turn-on instance, which corresponds to the delay angle,
      convert the delay angle to a motor speed command, and
      communicate the motor speed command to a motor controller for controlling the motor speed.

2. A system for controlling a motor speed of an AC motor based on a delay angle of a triac-controlled AC voltage signal from a triac, the system comprising:
   a simulated load configured to be connected to the triac and to enable a load current to flow through the triac to the simulated load and to create the triac-controlled AC voltage signal;
   a turn-on instance detector configured to detect a turn-on instance of the triac, wherein the turn-on instance occurs when the triac changes from non-conduction to conduction; and
   a speed command generator configured to—
      measure a time interval between a zero-crossing point of an AC voltage signal from an AC source and the turn-on instance of the triac, wherein the time interval corresponds to the delay angle, convert the delay angle to a motor speed command, and communicate the motor speed command to a motor controller for controlling the motor speed of the AC motor.

3. The system as set forth in claim 2, wherein the system is incorporated into an evaporative cooler having the AC motor in place of a PSC motor.

4. The system as set forth in claim 2, wherein converting the delay angle to the motor speed command is based on a minimum delay angle and a corresponding maximum selectable motor speed and a maximum delay angle and a corresponding minimum selectable motor speed.

5. The system as set forth in claim 2, wherein the speed command generator is implemented by a microprocessor having a timer, wherein the timer is configured to measure the time interval between the zero-crossing signal and the turn-on instance of the triac.

6. The system as set forth in claim 2, wherein the turn-on instance of the triac manifests as a falling edge or a rising edge on each half of the triac-controlled AC voltage signal.

7. The system as set forth in claim 2, wherein the simulated load includes a plurality of resistors connected in series.

8. The system as set forth in claim 7, wherein the plurality of resistors causes the load current to be below a holding current rating of the triac, thereby causing the triac to turn off after the triac is turned on and the time interval between the zero-crossing point and the turn-on instance of the triac is measured.

9. The system as set forth in claim 2, further including an isolated DC power supplied from the motor controller.

10. The system as set forth in claim 2, further including a DC-to-DC converter configured to provide DC power for powering the turn-on instance detector and the speed command generator.

11. The system as set forth in claim 2, further including a universal asynchronous receiver/transmitter configured to communicate the motor speed command to the motor controller.

12. A method of controlling a motor speed of an AC motor based on a delay angle of a triac-controlled AC voltage signal from a triac, the method comprising:

simulating a load connected to the triac to enable a load current to flow through the triac to the simulated load and to create the triac-controlled AC voltage signal;

detecting a turn-on instance of the triac, wherein the turn-on instance occurs when the triac changes from non-conduction to conduction;

measuring a time interval between a zero-crossing point of an AC voltage signal from an AC source and the turn-on instance of the triac, wherein the time interval corresponds to the delay angle;

converting the delay angle to a motor speed command; and communicating the motor speed command to a motor controller for controlling the motor speed of the AC motor.

13. The method as set forth in claim 12, wherein the method is implemented in an evaporative cooler having the AC motor in place of a PSC motor.

14. The method as set forth in claim 12, wherein converting the delay angle to the motor speed command is based on a minimum delay angle and a corresponding maximum selectable motor speed and a maximum delay angle and a corresponding minimum selectable motor speed.

15. The method as set forth in claim 12, wherein measuring the time interval, determining the motor speed command, and communicating the motor speed command are performed by a microprocessor having a timer, wherein the time interval between the zero-crossing signal and the turn-on instance is measured by the timer.

16. The method as set forth in claim 12, wherein the simulated load includes a plurality of resistors connected in series.

17. The method as set forth in claim 16, wherein the plurality of resistors causes the load current to be below a holding current rating of the triac, thereby causing the triac to turn off after the triac is turned on and the time interval between the zero-crossing point crossing and the turn-on instance of the triac is measured.

* * * * *